Sept. 18, 1923.
C. STICKLE
STEAM TRAP
Filed April 22, 1921
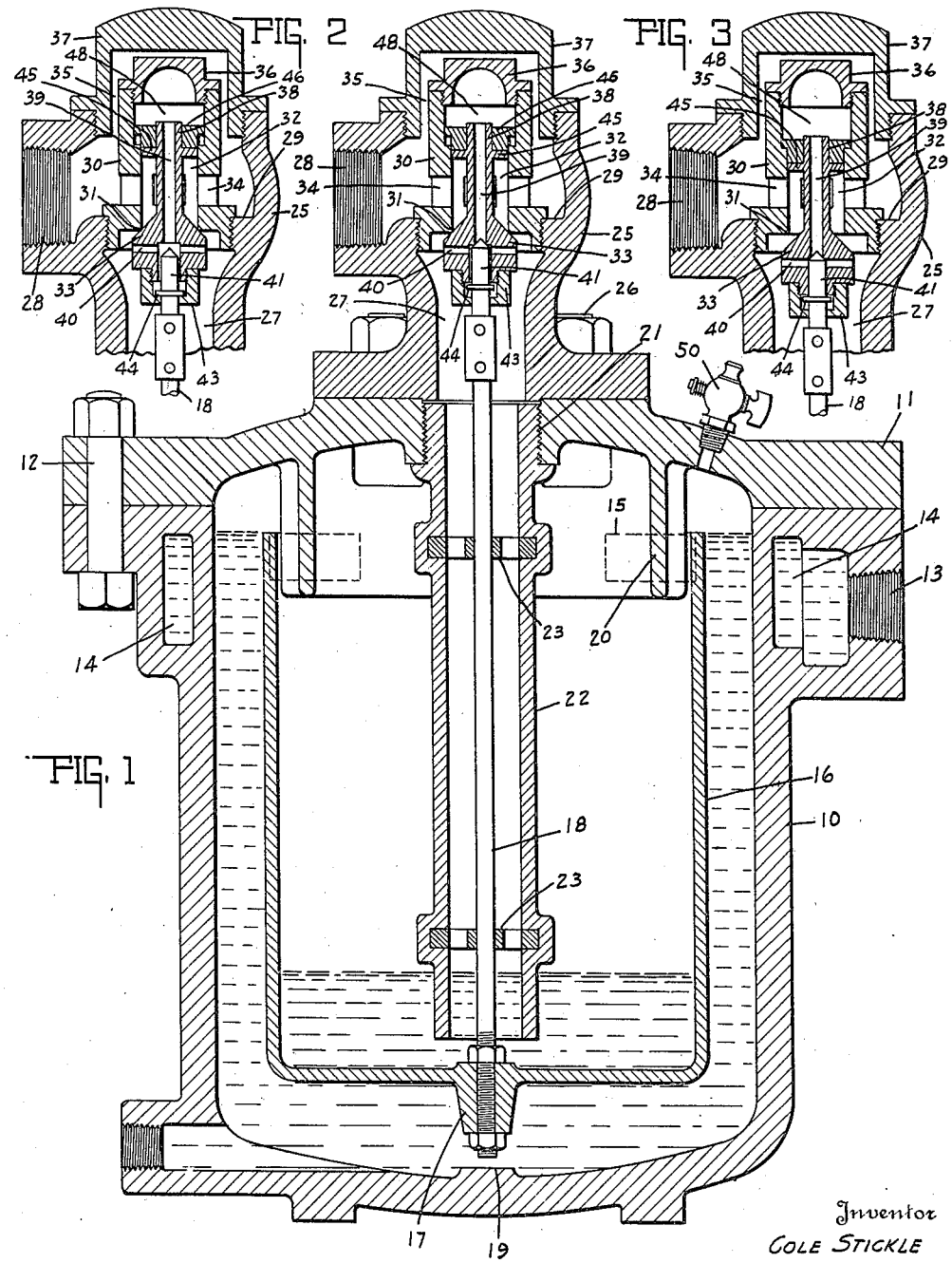
Inventor
COLE STICKLE
By Lockwood Lockwood
Attorneys Patented Sept. 18, 1923.

1,468,178

UNITED STATES PATENT OFFICE.

COLE STICKLE, OF INDIANAPOLIS, INDIANA, ASSIGNOR TO OPEN COIL HEATER & PURIFIER COMPANY, OF INDIANAPOLIS, INDIANA, A CORPORATION.

STEAM TRAP.

Application filed April 22, 1921. Serial No. 463,650.

*To all whom it may concern:*

Be it known that I, COLE STICKLE, a citizen of the United States, and a resident of Indianapolis, county of Marion, and State of Indiana, have invented a certain new and useful Steam Trap; and I do hereby declare that the following is a full, clear, and exact description thereof, reference being had to the accompanying drawings, in which like numerals refer to like parts.

The object of this improvement in steam trap valve construction is to make the action thereof very rapid and positive, and also increase the capacity of the steam trap by making it possible to open a discharge valve of the full size of the inlet pipe opening in the trap and thus facilitate the action of the trap.

In steam traps as heretofore made and used, the valve opening has usually been substantially one-eighth of the size of the pipe openings; whereas with this invention the valve opening is substantially the same in capacity as the inlet pipe opening, without any reduction in the pipe opening, so that the conduit through the trap is not reduced, nor is it obstructed in any way except by the valve when closed.

Other features of the invention consist in the construction whereby the parts thereof are upwardly removable from the upper part of the steam trap in order to render the valve mechanism accessible without taking the entire steam trap apart. Another feature consists in arranging the cage in which the main valve stem is mounted so it can be unscrewed and removed upwardly. Still another feature of the invention consists in mounting a disk loosely on the upper end of the main valve stem and cooperating with a fixed disk thereon and of larger diameter than the bore of said fixed disk and of the cage and the opening or port closed by the main valve, whereby the excess of pressure on said loose disk will open the valve and the construction permits the valve mechanism to be accessible and also to be taken apart in spite of the pressure in the trap.

The full nature of the invention will be understood from the accompanying drawings and the following description and claims:

In the drawings, Fig. 1 is a central vertical section of the steam trap provided with a new valve structure in closed position. Fig. 2 is a similar section of the new valve structure with a pilot valve open in process of opening the main valve. Fig. 3 is the same showing the main valve open.

The main portion of this trap is of old and common form. In it there is a cup-shaped vessel or casing 10 with a top plate 11 secured thereon by bolts 12. Said casing has at one side and near the upper end an inlet port 13 leading to an annular chamber 14 which opens into the interior of said vessel through square openings or ports 15 shown by dotted lines.

Within the casing 10 there is a float consisting of a cup-shaped vessel 16 with its upper end open and extending approximately to the top of the inlet openings or ports 15 in the wall of the outer vessel, but so as to be below the top of said openings when the float is down and just above the same when the float is up. The float 16 has a boss 17 extending centrally from its lower end through which a valve rod 18 extends and said valve rod engages a central lug 19 in the bottom of the inner surface of the outer casing or vessel 10, when the float 16 is down to its lowest limit of movement. The upper end of said float loosely surrounds and extends above the lower edge of an annular flange 20 extending down centrally from the top 11, as shown.

The top 11 has a central opening at 21 in which the upper end of a tube 22 is secured that extends down centrally of both vessels 10 and 16 almost to the bottom of the float chamber 16 and at intervals it has guide bars 23 for the valve rod 18.

A valve casing 25 is secured centrally on the top 11 by bolts 26 and it has vertical and centrally-located chambers 27 and 35. Chamber 27 is concentric with the tube 22 and rod 18 and is an upper continuation of the chamber in said tube 22. There is an outlet opening 28 leading from said chamber 35 to the discharge line. Within the casing 25 and on a lower level than the outlet 28, there is an annular rib 29 internally threaded to receive the lower threaded end of a cage 30. The lower part 31 of this cage 30 is a valve seat for the main valve 33 and there is a vertical central chamber 32 in said cage which communicates with the chamber 27 below and which is closed by the main valve 33, as seen in Fig. 1, and from which there are lateral outlets or openings 34 in the side wall of the cage 30, through which fluid may pass into the chamber 35 and out through the port 28 to the vacuum line. The upper end of the cage is open and has a removable cap 36 to close it. The upper end of the valve casing 25 is also open and has a screw cap 37 to close it.

The main valve 33 is adapted to close the lower end of the chamber 32 when in contact with the seat 31, when there is much water in the float chamber 10 and said float chamber is elevated, as shown in Fig. 1. The stem 38 of the main valve 33 is tubular to form a passageway 39 which is in communication with some lateral ports 40 in the body of the main valve 33. Said passageway 39 is closed by a pilot valve 41 which is at the upper end of the valve rod 18, said pilot valve or rod being of greater diameter than the passage 39 and having a tapered upper end, as seen in Fig. 1. On the lower end of the main valve there is secured a cap 43 surrounding the valve rod 18 and adapted to be engaged by a collar 44 on the valve rod, when the valve rod and float 16 move downward. Near the upper end of the main valve stem 38 there is secured a thin disk 45 which guides said valve stem in the chamber 32 and also there is a disk-like plate 46 loose on the upper end of the valve stem 38 which is of larger area than the main valve opening, and serves under pressure to force the main valve down into open position.

When condensation water accumulates in the float chamber 16 sufficient to overcome its buoyancy in the surrounding body of water in vessel 10, the float will move downward until the lower end of the valve rod 18 engages the stop lug 19. That will cause the pilot valve to open, as shown in Fig. 2, and permit the condensation water to be forced, by the pressure of the steam in the upper part of the float chamber, up through the chamber 27, passageways 40 and passageway 38 through the valve stem into a chamber 48 above the plate 46, and that will force the plate 46 and main valve downward to the open position shown in Fig. 3, which will enable the condensation water to pass out from the chamber 27 through the chamber 32 and side openings or ports 34 through the chamber 35 and outlet 28 to the vacuum line.

When sufficient water has thus escaped from the float chamber 16, its buoyancy in the surrounding body of water will cause the float vessel to move upward to the position shown in Fig. 1, which will also cause the valve rod 18 to move upward, and that will force upward the main valve cage to the position shown in Fig. 1, and thus cause the passageways 40 and 39 to be closed by the pilot valve 41 and the main outlet to be closed by the main valve 33, until the float chamber has another charge of condensation water sufficiently large to cause a repetition of the operation.

The disk-like plate 46 has a greater diameter than the main valve 33 and by reason of said greater area exposed to pressure, said plate automatically forces the main valve down from its seat. Said main valve has an area, in the form herein shown, more than eight times the area of the pilot valve 41, so that when the large valve 33 is open, the contents of the float chamber are very quickly discharged and the high velocity of the discharging water striking against the bottom of the main valve 33 with force, lifts the float chamber and causes a very sudden closing of the trap, when the amount of water in said float chamber has become low enough to permit this action. The quick action in opening and closing the trap thus makes a positive force to operate the trap, and at no time is it possible to have an equilibrium or a balanced position which would tend to let the trap stick and not open, or to let the trap stay open and not close and follow through, as often occurs in the ordinary steam trap. This results in increasing the capacity of this steam trap about eight times that of the ordinary steam trap, which makes the improvement a very important one. A pet cock 50 is provded in the top of the condensation chamber to permit the escape of air when necessary to relieve the chamber from excessive pressure therein.

The disk 45 fits loosely enough in the cylinder or cage 30, and the disk plate 46 is loose, so that when the parts are in the position shown in Fig. 1, with both valves 33 and 41 closed, the water in the chamber 48 will leak out through the opening 34, and the concal valve 33 be permitted to operate and adjustably seat itself without causing the disk or plate 46 to pinch against the surrounding wall and prevent the closing movement of the valve 33.

Also the cap 37 is upwardly removable by unscrewing it and then the cage 30 is upwardly removable by unscrewing it, and with the disk 46 loose on the valve stem, said cage can be readily lifted out in spite of the pressure in the steam trap. This enables the valve mechanism to be accessible and removable without taking the trap apart and with the trap left in its usual place.

Prior trap valve constructions have been planned and made but were not practical because they were inaccessible and because pressure in the steam trap prevents them from being taken apart.

The invention claimed is:

1. A steam trap including a chamber for the condensation water, a conduit extending from the upper end of said chamber, a float in said condensation chamber, a discharge outlet in communication with the upper end of said conduit, a main valve for controlling said discharge outlet with a vertical opening therethrough and enlarged at its lower end and with lateral openings from the enlarged portion of said vertical opening, and a pilot valve in said enlarged portion of the vertical opening in said main valve adapted to close the reduced upper portion thereof.

2. A steam trap including a chamber for the condensation water, a conduit extending from the upper end of said chamber, a float in said condensation chamber, a discharge outlet in communication with the upper end of said conduit, a main valve for controlling said discharge outlet with a vertical opening therethrough, a normally-closed chamber at the upper end of the opening through said valve, a piston-like disk on said valve, a valve rod extending upwardly through the conduit from the float with a pilot valve on the upper end thereof for controlling the passage through said main valve, and means on said rod for engaging the main valve during the downward and opening movement of the pilot valve and tending to open the main valve.

3. A steam trap including a chamber for the condensation water, a conduit extending from the upper end of said chamber, a float in said condensation chamber, a discharge outlet in communication with the upper end of said conduit, a main valve for controlling said discharge outlet with a vertical opening therethrough, a normally-closed chamber at the upper end of the opening through said valve, a piston-like disk on said valve, a valve rod extending upwardly through the conduit from the float with a pilot valve on the upper end thereof for controlling the passage through said main valve, a screw cap on the lower end of said main valve surrounding the valve rod with a chamber therein, and a collar on the valve rod in said last-mentioned chamber arranged to engage the screw cap on the downward movement of the pilot valve and aid in opening the main valve.

4. A steam trap including a chamber for the condensation water, a conduit extending downward from the upper end of said chamber, a float in said condensation chamber, a discharge outlet in communication with the upper end of said conduit, a cylindrical cage with an inlet chamber in communication with said outlet and the upper end of said conduit, a main valve for closing the lower end of said cage and having a tubular valve stem extending up into said cage, a disk secured near the upper end of said valve stem and loosely fitting in said cage, means for forming a normally-closed chamber in said cage above said valve stem, a disk loosely fitting on the upper end of the valve stem and having a greater diameter than the inlet chamber of said cage, and a valve rod secured to the float and extending up through said conduit with a pilot valve on the upper end thereof adapted to close the passageway through said main valve when the float is in its elevated position and to open the same when the float is in its downward position.

5. A steam trap including a chamber for the condensation water, a conduit extending downward from the upper end of said chamber, a float in said condensaation chamber, a discharge outlet in communication with the upper end of said conduit, a cylindrical cage with an inlet chamber in communication with said outlet and the upper end of said conduit, a conical main valve for closing the lower end of said cylindrical cage and having a vertical passage therethrough with the lower end enlarged and with lateral openings from said enlarged portion of said passageway, a disk secured near the upper end of said valve stem and loosely fitting in said cage, means for forming a normally-closed chamber in said cage above said valve stem, a disk loosely fitting on the upper end of the valve stem and adapted to rest in said fixed disk and having a greater diameter than the fixed disk and the inlet chamber of said cage, a valve rod secured to the float and extending up through said conduit, and a pilot valve adapted to close the reduced portion of the passageway through the main valve when the float is in elevated position.

6. A steam trap including a chamber for the condensation water, a conduit extending downward from the upper end of said chamber, a float in said condensation chamber, a discharge outlet in communication with the upper end of said conduit, a cylindrical cage with an inlet chamber in communication with said outlet and the upper end of said conduit, a valve casing secured on the upper end of said condensation chamber and having a chamber therein communicating with the upper end of said conduit and having a discharge outlet, a removable cap on the upper end of said valve casing, said cage being provided with a central chamber therein communicating with the surrounding chamber and said cage being secured so as to be upwardly removable, a main valve for closing the inlet to said valve cage and having a tubular valve stem extending up into said cage, a disk secured near the upper end of said valve stem, and loosely fitting in said cage, means for forming a normally-closed chamber above said valve stem, a disk loosely fitting on the upper end of the valve stem and having a greater diameter than the inlet chamber of said cage, and a valve rod secured to the float and extending up through said conduit with a pilot valve on the upper end thereof adapted to close the passageway through said main valve when the float is in its elevated position and to open the same when the float is in its downward position.

In witness whereof, I have hereunto affixed my signature.

COLE STICKLE.